March 20, 1945.  L. L. BOSCH  2,372,155
DISSIPATION OF HEAT FROM BUS BARS
Filed March 31, 1942

INVENTOR.
Lester L. Bosch
BY
ATTORNEYS

Patented Mar. 20, 1945

2,372,155

UNITED STATES PATENT OFFICE 2,372,155

DISSIPATION OF HEAT FROM BUS BARS

Lester L. Bosch, Cincinnati, Ohio, assignor to R. E. Kramig & Company, Inc., Cincinnati, Ohio, a corporation of Ohio Application March 31, 1942, Serial No. 437,055

4 Claims. (Cl. 174—133)

This invention relates to electric bus bars and is directed particularly to improvements for dissipating heat from the bus bars in order that they may operate more efficiently.

Electrical energy flowing through a bus bar causes the bar to become hot. Insurance underwriters have specified that no bus bar distribution system shall carry a current greater than that which causes a given temperature rise in any of its conductors; this limitation, which at present is a temperature rise of 50° C., is employed as a safeguard against fire hazards incidental to the heating of the bars. In the conventional systems, in which a plurality of bars are run in parallel relationship, the temperature rise is not uniform because of the factor of mutual inductance which the bars exert upon one another. The conductor bars in a center of a bank or plurality usually operate at a higher temperature than those at the outside due to the fact that they have lower electrical reactance and also because they have less opportunity of dissipating heat. Since the permissible operating capacity of a given bus bar distribution system is governed by the "hottest" member of the system in much the same manner that the capacity of a chain is limited by its weakest link, the dissipation of heat from the bars is an important consideration in their design and construction.

In copending patent application Serial No. 400,065, entitled "Electrical bus bars," I have disclosed an electrical insulator adapted for sheathing the bars in order that they may be insulated electrically from one another and yet be spaced closely together to improve the electrical operating characteristics of the distribution system. The sheathing disclosed in the copending application is made of asbestos fibers arranged in a dense compacted relationship. Such sheathing, paradoxically, is a good insulator of heat; in fact, a bar sheathed with such insulation actually dissipates more heat than an unsheathed bar operating in the same environment under equal conditions. In this manner a cooling effect is exerted on the bus bars inasmuch as the heat at the surfaces of the sheaths may be carried off by air currents.

However, it is frequently desirable to house a bank of bus bars in a dust-proof and substantially airtight casing of sheet metal or the like, in order to protect the bank of bars against mechanical damage and also as an electrical safeguard. In such case the air currents are feeble at best and heat transfer by convection is limited. On the other hand, dissipation of heat by radiation is not and cannot be appreciable since the bars are spaced flatwise adjacent one another and heat rays emanating from the bars are reabsorbed by adjacent conductors. Consequently only the radiations emanating from the faces of the outermost members of the bank are dissipated.

This invention, briefly, is predicated upon the concept of configurating the faces of the bars in such manner that they constitute reflecting surfaces for mutually reflecting radiation toward the casing from whence the heat is dissipated. In the preferred structure the faces of the bars provide facets or reflecting surfaces capable of directing heat radiations upwardly through the spaces between the bars and thus away from the bank assembly. The invention contemplates the provision of such facets upon the bars themselves in the event they are to be used in an unsheathed assembly and it also contemplates the provision of such facets on sheathing of the type shown in the aforesaid copending patent application where that type of structure is to be employed. The latter method is preferred inasmuch as the sheathing is capable of transmitting heat from the bars to the surfaces of the sheaths from whence such heat is dissipated by reflected radiation.

In either of these methods the heat from the bar is carried more efficiently to the enclosure. The enclosure or casing in turn operates at a higher temperature and therefore dissipates heat at a faster rate. Consequently, a balance between the generation of heat and the dissipation of heat is established at a lower bar temperature.

A preferred arrangement for practicing the invention in a simple and commercial way is shown in the drawing.

Figure 1:
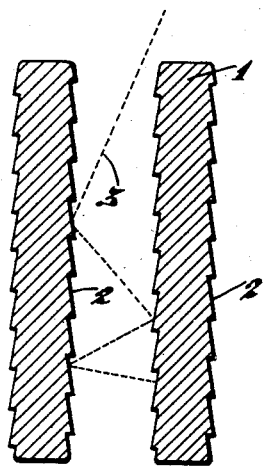
Figure 1 is a cross section through a pair of unsheathed bus bars having their flatwise faces configurated in accordance with the present invention.

The bar 1 shown in Figure 1 is a rectangular copper member, substantially wider than it is thick and varying in size from one-eighth to a quarter of an inch in thickness and from two inches to six inches in width. The bar may either be solid or hollow shaped and from eight to ten feet long. Such bars are connected end to end to constitute an electrical conductor of a distribution system. If D. C. current is to be carried the bars are run in pairs. If A. C. three-phase current is to be carried the bars usually are run in banks of 3, 6, 9, 12, etc.

At the wide, flatwise faces of the bars reflecting facets 2 are provided. In the construction shown in Figure 1 these facets extend longitudinally of the bar and are arranged in grooves somewhat saw-tooth in cross section.

The dotted line 3 represents the path of a single radiation emanating from a point near the bottom of the right hand bar as such a ray is reflected upwardly by the facets through the space intermediate the bars. Obviously there are many such radiations and not all follow the exact path of the one disclosed. However, it may be seen that the reflecting surfaces constitute a major portion of the face of each bar while the shoulders intermediate the facets constitute but a minor portion. A portion of the radiation striking the shoulders may be reabsorbed. However, only a minor portion of the total radiation is absorbed in this manner either by the bar from which it originated or by an adjacent bar, and the majority of the radiation is reflected back and forth and eventually away from the bank. When these faces are flat as in the conventional manner the radiation simply passes back and forth between the bars with deflection and only a very minor portion of the radiation is scattered.

The adjacent bars, which are representative of bars in an assembly, are arranged in relation to one another in such manner that the facets 2 are mutually cooperative, that is, the radiation reflected upwardly from one facet to a facet on an adjacent bar, in turn, is again reflected upwardly by the incident facet, eventually causing the rays to leave the top of the bank. The facets, in the alternative, may be arranged for mutual reflection of the rays in a downward direction. However, this procedure does not give as good results inasmuch as some convection does take place even in a substantially airtight casing system.

Figure 2:
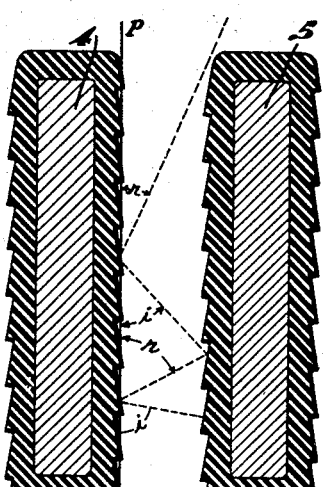
Figure 2 is a view similar to Figure 1 showing a pair of conventional rectangular bus bars encased in sheaths which are configurated in accordance with the present invention.
Figure 3:
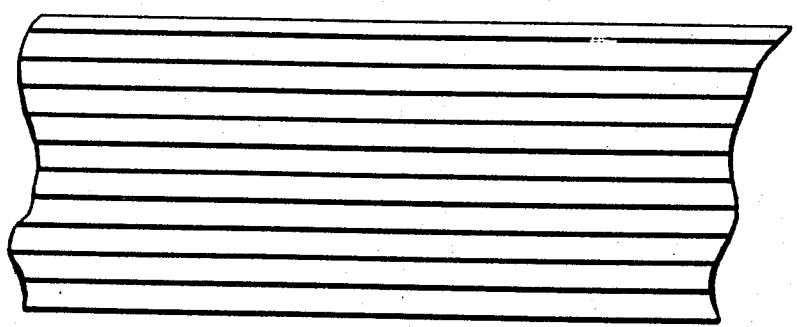
Figure 3 is a side elevation of a bar of the structure shown in Figure 2.

The bus bars 4 and 5, shown in Figure 2, are of the conventional flat shaped rectangular type but these bars are encased in sheathing of the type shown in the aforesaid copending patent application. The sheaths, however, in this case are provided with reflecting facets of the type previously described and the facets on the sheaths cooperate with one another to direct the rays away from the bank in the manner previously described. Thus, as may be seen from Figure 2, the angle of incidence $i$ of the radiation, as measured with respect to the plane of configuration $p$ taken flatwise through the bar, is different from the angle of reflection, $r$.

Figure 4:
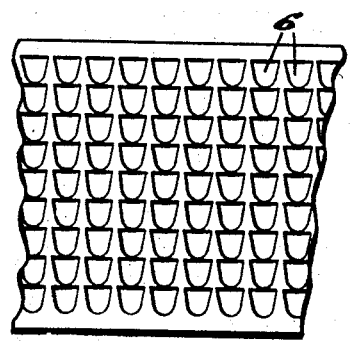
Figure 4 is a view similar to Figure 3 showing a modified arrangement of reflecting facets.

Facets provided by configurating the faces of the bars longitudinally in the saw-tooth construction disclosed are preferred in that the bars or sheaths may be configurated by a simple rolling operation. However, other configurations may be employed which provide reflecting surfaces suitably arranged in angulated relationship to one another to direct the radiation in the manner disclosed. Thus the facets 6 as shown in Figure 4 are rasp-like indentations provided either in the face of the bars or sheathing in which the bar may be encased.

From the foregoing description of the principles of the invention and from the several modifications which have been described those skilled in the art readily will understand the variety of modifications to which the invention is susceptible.

Having described my invention, I claim:

1. A bus bar having upon its surface a plurality of facets which are angularly arranged with respect to an axis taken through the plane of configuration of the bar in such manner as to direct heat radiation coming toward the bar at right angles to the plane of configuration away from the bar at an angle other than a right angle.

2. A bus bar system comprising at least a pair of bus bars having their flatwise faces extending in substantially parallel relationship, the opposing faces of said bars having a plurality of facets arranged thereon for reflecting heat radiation emanating from one bar toward the bar from which it originated but at such an angle that the reflected radiation strikes the bar from which it originated at a different elevation.

3. A bus bar system comprising at least a pair of elements through which electricity is conveyed at their interior portion, the said elements having opposing faces arranged in spaced relationship, with the said opposing faces having means thereon for reflecting heat radiation directed thereto in such a manner that the angle of reflection measured with respect to the plane of configuration of the unit is different from the angle of incidence.

4. An electrical bus bar comprising an electrically conductive member having upon its surface a plurality of grooves extending longitudinally upon its flatwise faces, the said grooves being arranged in a substantially saw-tooth relationship cross-sectionally of the bar and providing facets for cooperatively directing upwardly and away from the bar, heat radiation emanating from an adjacent bar.

LESTER L. BOSCH.